United States Patent
Illemann et al.

(10) Patent No.: US 9,035,266 B2
(45) Date of Patent: May 19, 2015

(54) DOSIMETER AND METHOD FOR DETERMINING AN ENERGY DOSE OF A PULSED RADIATION FIELD

(75) Inventors: Jens Illemann, Braunschweig (DE); Christoph Makowski, Braunschweig (DE)

(73) Assignees: BUNDESREPUBLIK DEUTSCHLAND, Braunschweig (DE); VERTRETEN DURCH DAS BUNDESMINISTERIUM FUR WIRTSCHAFT UND TECHNOLOGIE, Braunschweig (DE); DIESES VERTRETEN DURCH DEN PRASIDENTEN DER PHYSIKALISCH-TECHNISCHEN BUNDESANSTALT, Braunschweig (DE)

( * ) Notice: Subject to any disclaimer, the term of this patent is extended or adjusted under 35 U.S.C. 154(b) by 721 days.

(21) Appl. No.: 13/265,793

(22) PCT Filed: Apr. 15, 2010

(86) PCT No.: PCT/DE2010/000431
§ 371 (c)(1),
(2), (4) Date: Dec. 15, 2011

(87) PCT Pub. No.: WO2010/121589
PCT Pub. Date: Oct. 28, 2010

(65) Prior Publication Data
US 2012/0126135 A1 May 24, 2012

(30) Foreign Application Priority Data

Apr. 23, 2009 (DE) .......................... 10 2009 018 335

(51) Int. Cl.
*G01T 1/17* (2006.01)
*G01T 1/02* (2006.01)
(52) U.S. Cl.
CPC .... *G01T 1/17* (2013.01); *G01T 1/02* (2013.01)
(58) Field of Classification Search
USPC ........................................................ 250/374
See application file for complete search history.

(56) References Cited

U.S. PATENT DOCUMENTS 5,006,714 A * 4/1991 Attix .............................. 250/368
5,083,028 A 1/1992 Decossas et al.
(Continued)

FOREIGN PATENT DOCUMENTS

AT 008309 U1 5/2006
DE 3640756 A1 6/1988
(Continued)

OTHER PUBLICATIONS

Maughan R L et al: "A measurement of the fast-neutron sensitivity of a Geiger-Müller detector in the pulsed neutron beam from a superconducting cyclotron", Physics in medicine and biology, Taylor and Francis Ltd., London, GB, 41, No. 8, Aug. 1, 1996, pp. 1341-1351, XP000594625.
(Continued)

*Primary Examiner* — David Porta
*Assistant Examiner* — Mindy Vu
(74) *Attorney, Agent, or Firm* — Whitham Curtis Christofferson & Cook, PC

(57) ABSTRACT

The invention concerns a dosimeter for the determination of an absorbed dose (D) of a radiation field (26), the dosimeter having a dosimeter probe (12), which has (a) a sensor (14), which has a sensor volume that emits electrical charges (Q) when exposed to ionizing radiation, (b) a cable (18) for the transmission of the charges (Q) and (c) an evaluation unit (20), which is designed for the capture of a physical quantity (U), which corresponds to the emitted electrical charge (Q), which is characterized by the fact that the evaluation unit (20) is arranged for (d) the detection of a interval cycle of the radiation field (26), (e) the recording of a measurement number of measurements of a physical quantity (U) corresponding to the electrical charge, which is always read at the same time relative to the interval cycle, so that an initial raw measured value (U1) and at least one second raw measured value (U2) are obtained per interval, and (f) the calculation of a measured value (D) from the at-least two raw measured values (U1, U2) which is unambiguously related to the absorbed dose (D) deposited in the sensor volume.

36 Claims, 5 Drawing Sheets

(56) References Cited

U.S. PATENT DOCUMENTS 6,665,161 B1 12/2003 Brady et al.
2008/0156517 A1* 7/2008 Varkey et al. .................. 174/107

FOREIGN PATENT DOCUMENTS

| DE | 10042076 A1 | 5/2001 |
| WO | 2006/080004 | 8/2006 |
| WO | 2006008004 A2 | 8/2006 |

OTHER PUBLICATIONS

Translation of International Search Report of International Application No. PCT/DE2010/000431; Sep. 27, 2011.

* cited by examiner

DOSIMETER AND METHOD FOR DETERMINING AN ENERGY DOSE OF A PULSED RADIATION FIELD

FIELD OF THE INVENTION

The invention relates to a dosimeter designed for the determination of a physical quantity with an unambiguous relation to an absorbed dose of a radiation field, in particular for the determination of an absorbed dose, wherein the dosimeter has a dosimeter probe which includes (a) a sensor, possessing a sensor volume, which creates an electrical charge when exposed to ionizing radiation, (b) a lead for the transfer of charges and (c) an evaluation unit which is arranged for the capture of a values corresponding to the emitted electrical charge.

According to a second aspect, the invention concerns a method for the determination of an absorbed dose of a pulsed radiation field.

This type of dosimeter is used, for example, to determine the absorbed dose and the absorbed dose rate of radiation therapy equipment. Such radiation therapy equipment accelerates electrons, protons or heavy ions. Accelerated electrons are often fired at a target so that highly energetic photon radiation occurs, which is turned into a beam by means of apertures. For therapeutic use, the photon beam should have a diameter which is as small as possible. The use of a photon beam with a beam diameter of 4 cm or less has increased considerably in the last few decades without the availability of efficient methods for small field dosimetry. In order to avoid radiation damage of patients and to be able to carry out a reproducible radiation therapy, the applied absorbed dose must be noted with extreme accuracy.

BACKGROUND OF THE INVENTION

Known indicated dosimeters include primarily ionization chambers and semiconductor sensors which, during the invasion of ionizing radiation into the sensor material, cause a absorbed dose proportional charge separation. The collected charge or the related discharge current can then be captured by an evaluation unit. The charge which has been collected over a period of time multiplied by a calibration factor gives the total absorbed dose.

In AT 008 309 U1 a method is described for the detection and counting of small electronically charged particles, by which a threshold value is increased if a measurement taken during a the beginning of a certain time period is too different from that taken at the end. In this way, it is possible to capture individual highly energetic particles in real time. However, the disadvantage with this is that it occurs at the expense of the accuracy of the measurement, which is extremely important, especially concerning therapeutic radiation equipment.

In DE 36 40 756 A1 a warning device is described for the detection of beams of ionizing radiation, by which the discharge of a capacitor, protected from the light and plugged into a corresponding low-voltage source, is captured. This kind of detection device is not suitable for the precision capture of x-rays from therapy equipment.

A dosimeter according to the preamble of claim 1 is described in U.S. Pat. No. 6,665,161 B1. The dosimeter is designed based on a particularly high sensitivity towards ionizing radiation, whereby the dosimeter includes an integrated field circuit with a built-in differential amplifier. However, this kind of dosimeter is not suitable for use in radiation therapy equipment, as the dominant radiation would cause the saturation of the dosimeter.

In DE 100 42 076 A1 a dosimeter according to the preamble of claim 1 is also described for the simultaneous determination of fast and thermal neutrons, as well as gamma radiation in personal dosimeters. The disadvantage of this dosimeter is that the sensor is so large that a beam with a small diameter, for example less than 3 cm, can only be roughly measured. With such small beam diameters, the absorbed dose rate depends so highly on a distance from the center of the beams that the absorbed dose rate on one side of the sensors differs significantly from the absorbed dose rate at another end of the sensor. The dosimeter captures an average so that an exact result concerning the absorbed dose rate at each point on the cross section of the beam is not possible.

Another disadvantage is that, with known dosimeters, the size of the dosimeter probe and also the sensor cannot be further reduced because it leads to significant measurement errors, due to following reasons: the smaller the sensor probe and therefore the sensor, the fewer the charges that are released from the ionizing radiation. Each dosimeter probe does however inevitably have a leakage current. In addition, parasitic ionization occurs in the radiation field. Both effects cause charges, which add to those charges which are to be lead directly back to the absorbed dose of the beam. The leakage current and the parasitic ionization do not decrease at the same rate depending on the size of the dosimeter probe, like the current resulting immediately from ionization. In this way, the smaller the dosimeter probe and therefore the sensor, the worse is the signal-to-noise ratio.

SUMMARY OF THE INVENTION

The objective of the invention is to reduce the disadvantages of the prior art.

The invention solves the problem via a dosimeter according to the preamble of claim 1, the evaluation unit being arranged for the detection of interval cycles in the radiation field, the collection of a measurement number of measurements of a physical quantity corresponding to the electrical charge, which is always read at the same time relative to the interval cycle, so that an initial raw measured value and at least one second raw measured value are obtained per interval cycle, and the determination of the measured value, especially the absorbed dose, from the at least two raw measured values.

According to a second aspect, the invention solves the problem with a method for the determination of an absorbed dose of a pulsed radiation field with the steps (a) the arrangement of a dosimeter in the radiation field, the dosimeter including a sensor with an active sensor volume, (b) the determination of an interval cycle in the field of radiation, (c) the collection of a measurement number of measurements of a physical quantity corresponding to the electrical charge, which is always read at the same time relative to the interval cycle, so that an initial raw measured value and at least one second raw measured value are obtained per interval cycle, and (d) the determination of the absorbed dose from the at least two raw measured values.

The advantage of the solution according to the invention is that the absorbed dose and the absorbed dose rate can be determined with a significantly higher accuracy and speed. In this way, since the measurements are recorded at the same time relative to the interval, the release of the charges in the sensor at each point of time with respect to the interval can be determined. In addition, this allows for conclusions to be drawn about the background signal, particularly the background from leakage currents, system humming and parasitic ionization. In this way the proportion which the radiation has directly caused in the sensor can be measured. Despite the bad signal-to-noise ratio, the absorbed dose or the absorbed dose rate can thus be determined with high accuracy, so that the sensor can be made much smaller than with current dosimeters. In turn, this enables a high spatial resolution of the dosimeter and high measurement accuracy.

In terms of the aforementioned description, the term sensor, which may in particularly be a chamber or a semiconductor sensor, is to be understood to mean, for example, a semiconductor diode or a semiconductor crystal such as diamond or silicon. Alternatively, sensor can refer to, for example, a scintillator with a luminescence detector.

The term dosimeter is to be understood as the device in which the sensor is housed and which is connectable or connected to the evaluation unit by means of an electric wire.

The feature that the evaluation unit is arranged for the completion of the given steps is to be understood in that the control unit has a digital memory, in which a program code is filed. This program code causes the control unit to carry out the given steps.

The feature that the evaluation unit is arranged for the capture of the physical quantity corresponding to the emitted electrical charge is to be understood in that the evaluation unit is arranged for the time-integrated collection of the value over entire intervals. This means that the value is collected over the complete interval cycle. This value can refer to, for example, the electrical charge itself, an electrical current or a voltage, if the dosimeter has a pre-amplifier.

The electric evaluation unit can be installed in such a way that an interference signal can be filtered out at the beginning of the interval cycle. This kind of interference cycle is generally caused by an electromagnetic pulse, which is emitted by the radiation source accelerator at the beginning of the interval cycle and is coupled into the electric wire leading from the sensor to the evaluation unit.

The evaluation unit is in particular arranged for the determination of the measured value taken from the at-least three raw measured values. Preferably, the evaluation unit is also arranged to detect an underground signal which is not periodic with the cycle of the radiation field from the at-least three raw measured values. Known dosimeters make particular use of insulated and shielded wires which have a triaxial construction and stiff, approx. 1 mm thick insulation layers in order to achieve an insulation resistance of considerably more than 1 tera-ohms. The evaluation unit designed as described enables a significant reduction of the wire thickness, as errors resulting from this thickness can be eliminated.

It is particularly advantageous for the dosimeter to have a sensor whose active sensor volume is so small that a radiation field with an absorbed dose rate of 1 gray per minute leads to an emitted current of less than 10 nanoamperes.

It is especially favorable if the sensor volume is so small that the emitted current from the given absorbed dose rate is less than 1 nanoamperes. Sensor volumes can even be reduced to such a size which have an emitted current from the above mentioned absorbed dose rate of considerably less than 500 picoamperes. A sufficiently high measuring accuracy could not be guaranteed with such small sensor volumes with known dosimeters. With these kinds of small active sensor volumes, a dosimeter according to the invention generally has a relative particular accuracy of $10^{-3}$ or better.

The sensor volume is preferably so small that a photon pulse with a pulse duration of 3 microseconds, originating from a therapy accelerator, in which electrons with four megaelectronvolts are used for a pulse rate of 300 pulses per second and which has an average absorbed dose rate of 2 grays per minute, leads to an emitted charge of less than 50 picocoulombs. Dosimeters of the prior art require significantly higher charges per pulse or long integration times in order to have a sufficiently high accuracy. Despite this small sensor volume, a relative measured accuracy of $10^{-3}$ or better can be achieved with the dosimeter according to the invention.

The evaluation unit preferably includes a device for the capture of a trigger signal from a radiation source, particularly a therapeutic radiation source with an electron accelerator. This kind of therapeutic radiation source is operated in pulse mode. They generate radiation pulses with a pulse duration of, for example, one to three microseconds and with a frequency from 10 Hz to 400 Hz, which corresponds to a repetition time from 100 to 4 milliseconds. Each radiation pulse is induced in such a way that an electron beam is accelerated to a predetermined electron energy. The corresponding acceleration equipment also receives a trigger signal from a control system of the radiation therapy equipment. At the beginning of the acceleration an electromagnetic impulse occurs which can influence the radiation measurement. Should the trigger signal be captured then a delay time can be allowed for after which the measurement of the charge released by the radiation pulse or the corresponding derived value is begun.

The term trigger signal is to be generally understood as a signal which announces a radiation pulse. In this way, the electromagnetic pulse, which is emitted by the radiation source at the beginning of the acceleration process, can also be seen as a trigger signal.

Alternatively or additionally, the value corresponding to the emitted electrical current is scanned with a sampling frequency, which is large in contrast to the cycle frequency, so that more than 10 measured values can be taken per interval cycle. The edge is then detected by the evaluation unit via an edge detection algorithm, which indicates the beginning of the interval cycle.

Furthermore, it is additionally or alternatively possible that the value corresponding to the emitted electrical charge is filtered via blanking or via a filter, so that the interference impulse at the beginning of the interval cycle is suppressed.

The dosimeter probe of each and every dosimeter must be calibrated. To do this, the dosimeter probe is, for example, submerged in a water bath in such a way that the beam runs through 10 centimeters of water before it comes into contact with the dosimeter probe. As a standard, a reference dosimeter probe with an ionization chamber is hung in the water bath at the corresponding place in the beam. Should the x-ray, as is common with therapy accelerators, only have a small diameter, its radiation field is disturbed by the presence of the dosimeter probe and its cable. The calibration with the reference dosimeter probe thus causes an error, which poses a problem.

For the solution of this problem the invention proposes a dosimeter probe which has a sensor, which emits an electrical charge during radiation with ionizing radiation and has a cable for the electrical charges, wherein the cable is made of a water equivalent material.

This dosimeter probe, with the thinnest possible and water equivalent lead, can remain close to the dosimeter probe to be calibrated in the beam during calibration, so that the aforementioned disadvantages do not occur.

The term a water equivalent material for ionizing radiation is to be understood as a material which possesses the same scattering cross section as water for all relevant interactions. This means that it has the advantage that the transfer of radiation in a water bath is not disturbed by its presence. It is essential that the photo effect of the inner electrons, the pair formation effect and the Compton scattering are taken into account. The former depend on the atomic number in different degrees, the latter on the electron density and thus fundamentally on the hydrogen content of the substance.

According to a preferred embodiment, the cable has at least one carbon fiber for the conduction of the electrical charge. In this way, the influence of the lead on the measurement result is further reduced. The use of carbon fibers means metals can be avoided, which fundamentally impair the material properties with regard to the water equivalent because they have a substantially higher atomic number than the oxygen in the water. By means of insulation layers or additional synthetic fibers, which, in terms of mass, have a higher hydrogen content than water, the electron density of the entire cable can be increased. The mass density can be decreased to that of the water by means of trapping air in the carbon fiber wires. These air canals are advantageous as they simultaneously provide the ionization chambers with the necessary ventilation, whereby the carbon fibers feature a filter effect, in terms of air contamination, in particular dust.

Preferably, the carbon fibers have a collective diameter of less than one millimeter. This further reduces the influence of the measuring cable.

It is favorable if the cable is a coaxial cable. It is especially favorable if the cable is a triaxial cable. A coaxial cable includes a shielded insulation, a conductive shield, an inner insulation and a conductive core, whereby the layers mentioned go from the outside inwards. A triaxial cable also includes, from the outside inwards, an outer insulation and an outer shielding around the coaxial cable.

For example, the outer insulation is made of polyolefin and has an inner diameter of 0.6 mm with a wall thickness of 0.04 mm. The outer shield can include carbon fibers and an acryl-graphite-colloid. The shielded insulation preferably includes a polytetrafluoroethylene tube with an inner diameter of 0.4 mm with a wall thickness of 0.05 mm. The inner shield preferably includes woven carbon fibers, whereby, for example, three hundred carbon fibers with a diameter of 5 µm can be used. Polytetrafluoroethylene can be used as inner insulation in the form of a tube with an inner diameter of 0.2 mm with a wall thickness of 0.05 mm. For the core, 5 µm carbon fibers, for example, are used, whereby 600 carbon fibers are sufficient.

If the sensor volume is an ionization chamber, particularly one with a volume smaller than 100 cubic millimeters, water can diffuse into the ionization chamber volume. The ionization chamber volume must then be ventilated. This is difficult with thin cables. Preferably, according to the invention, the spaces between the insulation layers are used, in which the shield and the core for the aeration and ventilation of ionization chambers are found. The advantage of this is that it prevents an additional, larger diameter which would be disadvantageous for the water equivalent.

The air exchange to and from the ionization chamber through the channels in the tube-like spaces can be accelerated by additional measures, such as pumps. A possible simple measure is the heating of a cable opening on the connection side at the pre-amplifier by means of resistance heating. This difference in temperature at the openings of the air channels leads to air transportation by means of the chimney effect. This can also be carried out with gases other than air in order to achieve another response from the dosimeter.

Preferably the sensor is surrounded by a synthetic housing. It is especially advantageous if the synthetic material has water equivalent properties. Instead of a water equivalent synthetic material for the sensor housing and a water equivalent lead, a tissue equivalent synthetic material and a tissue equivalent lead can be used, if the dosimeter probe should be inserted into tissue or a tissue equivalent according to the dose. Tissue equivalence is given if the cross section and the density of the different effects are similar to those of the corresponding biological tissues.

Radiation therapy equipment emits ions, protons, electrons or photons with abroad energy spectrum. For the measurement of the absorbed dose it must be ensured that the ionization captured by the dosimeter probe can be limited to the absorbed dose which would be deposited in human tissue, independent of the type of radiation and the position. However, sensors indicate, for example, on the basis of a silicon crystal, an ionization which depends on a type of secondary electron energy, that a direct conclusion to the depositing of energy in water is not possible.

According to the prior art, this problem is solved by measuring correction factors for a predetermined spectrum of the radiation source, or by adding a powder with elements which have a high atomic number to the sensor, which may also be called a probe.

However, in real radiation fields this leads to considerable discrepancies. This is especially true if the diameter of the irradiated beam is smaller than 4 cm, or the dose must be measured in the edge region of a radiation field.

A system is known which solves this problem with the help of two virtually identical ionization chambers, which differ only in the choice of the material used for the chamber walls. The disadvantage is that, because of the size, the use of a relatively large proportion of heavy elements and the air volume that comes with it, the radiation field to be measured is disturbed, which leads to unknown discrepancies or discrepancies which have to be corrected.

According to one aspect of the invention, this problem is solved by a dosimeter probe which, along with the first sensor, has at least a second sensor, which has a sensor material that is different to the sensor material of the first sensor and which thus has a secondary sensor response for the various radiation proportions, according to particle type, particle energy and direction of incidence, which is different to the primary sensor response of the first sensor.

For example, the two sensors are semiconductor diodes made from different semiconductor materials. Alternatively, structurally identical ionization chambers also come into consideration, in which the measurement gas is different. The use of semiconductor sensors is advantageous, as they have substantially smaller dimensions than ionization chambers and are therefore also suitable for fields with a high dose gradient. In addition, they can take measurements from virtually the same measurement point.

The dosimeter according to the invention preferably includes at least two dosimeter probes that are connected to one another and having sensors according to the invention, which are located close to one another. It is favorable to consecutively carry out several measurements with the connected sensors within the scope of a method according to the invention, whereby the sensors are shifted in the direction of their connecting axis so that at exactly the same measurement, at almost the same time, the signal can be recorded with the different sensors.

The relative response rate quotient, with regards to proportions of electron radiation with a certain energy between two sensors, can be described with the Bragg-Gray theory, if the sensor dimensions are small compared with the electron range at the given energy in the sensor material. The important property of the sensor material is the collision stopping power in relation to that of water. The collision stopping power is proven to be almost constant for silicon as sensor material in particular, at energies in the range from a few kiloelectronvolts to several megaelectronvolts, so that the water-energy-dose, caused mainly by electron radiation, is correctly indicated, independent from the energy spectrum. The second sensor is then selected in such a way that, as is described below, differences in the ionization, caused by photons in the bremsstrahlung range, can be compensated.

The additional sensor signal, caused by photo electrons, can be described in the kerma approximation, since the sensor dimensions are small in comparison to the attenuation length of the photo electrons, but large in comparison to the range of the occurring photo electrons. The corresponding signal is proportional to the mass-energy absorption coefficient for photons for the sensor material. The photo effect makes a significant contribution for moderate energies, i.e. for silicon as a sensor material under 100 keV and gallium under 200 keV, and is highly dependent upon the atomic number of the materials in use.

For example, one sensor may be a silicon diode and a second a gallium nitride diode. The element with the highest atomic number is dominant—in the example this would be gallium. By taking measurements at the same position quickly after one another, two signal sequences are obtained which differ from each other, dependent from the photon background radiation. According to a preferred embodiment, the first sensor, concerning a direction of incidence of the radiation field, is therefore located in front of the second sensor.

Due to the mass-energy absorption coefficients $\mu_{en}/\rho$ of gallium (which is dominant in gallium nitrate), which are ten times larger than those of silicon, the signal of a gallium nitrate diode can be used as a measure of the signal proportion of photon radiation up to 100 keV. According to a preferred embodiment, the first sensor and the second sensor are thus selected in such a way that a kerma related portion of the emitted electrical charge is mathematically eliminable. To this end, for example, an active surface area of 80 μm×80 μm of the gallium nitrate sensor is selected. In a method according to the invention, the kerma related portion of the emitted electrical charge is preferably eliminated, so that the resulting signal is proportional to the water absorbed dose. The dosimeter probe can then be identified as water equivalent.

According to a preferred embodiment, this dosimeter probe is part of a dosimeter which also has an evaluation unit. This evaluation unit is, according to a preferred embodiment, suitable for the determination of a bremsstrahlung portion. In this way, the radiation quality can be described in particular detail. It is therefore then possible to detect error functions of the radiation source caused by incorrect adjustment of apertures or panels.

BRIEF DESCRIPTION OF THE DRAWINGS

In the following, the invention is explained in more detail by means of exemplary model examples, with regards to the attached drawings.

DETAILED DESCRIPTION OF THE INVENTION

Figure 1:
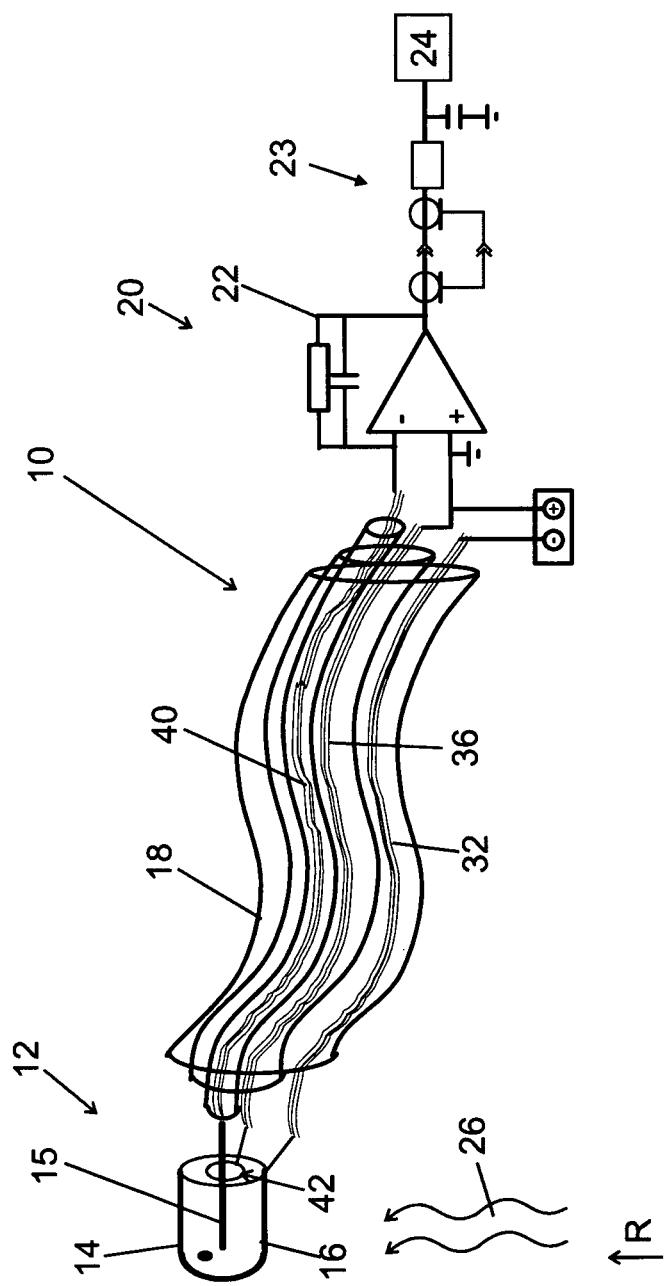
FIG. 1 shows a schematic view of a dosimeter probe according to the invention, according to a first embodiment, FIG. 2 the curve of the emitted electrical charge, which is dependent on time, with an illustration of the evaluation in the circumstance that two measurement points are recorded per interval cycle, FIG. 3 the curve of the emitted electrical charge, which is dependent on time, with an illustration of the evaluation for the circumstance that three measurement points are recorded per interval cycle, FIG. 4 the curve according to FIGS. 2 and 3 in case that a large number of measurements are recorded, FIG. 5 a cross section through a quasi-water equivalent cable of the dosimeter probe according to FIG. 1, and FIG. 6 a dosimeter according to the invention, and FIG. 7 an aeration via the coaxial cable.

FIG. 1 shows a dosimeter 10 according to the invention in a schematic view, which includes a dosimeter probe 12. Alongside a holder, the dosimeter probe 12 has a sensor 14, which in turn has a central electrode 15, schematically depicted, which is surrounded by an outer electrode 16. When exposed to ionizing radiation, the central electrode 15 emits electrical charges Q, which are conducted through a cable to an evaluation unit 20.

The evaluation unit 20 includes a pre-amplifier 22 and a computing device 24, schematically depicted. The computing device 24 can be designed as an independent processor, but also as a desktop computer.

Should the dosimeter probe 12 be introduced into a radiation field 26, schematically depicted, whereby the beams run in a direction of incidence R, the central electrode 15 emits an electrical charge, Q which is transported to the pre-amplifier 22 via a cable 18. A voltage U then is present at the computing device 24.

Figure 2:
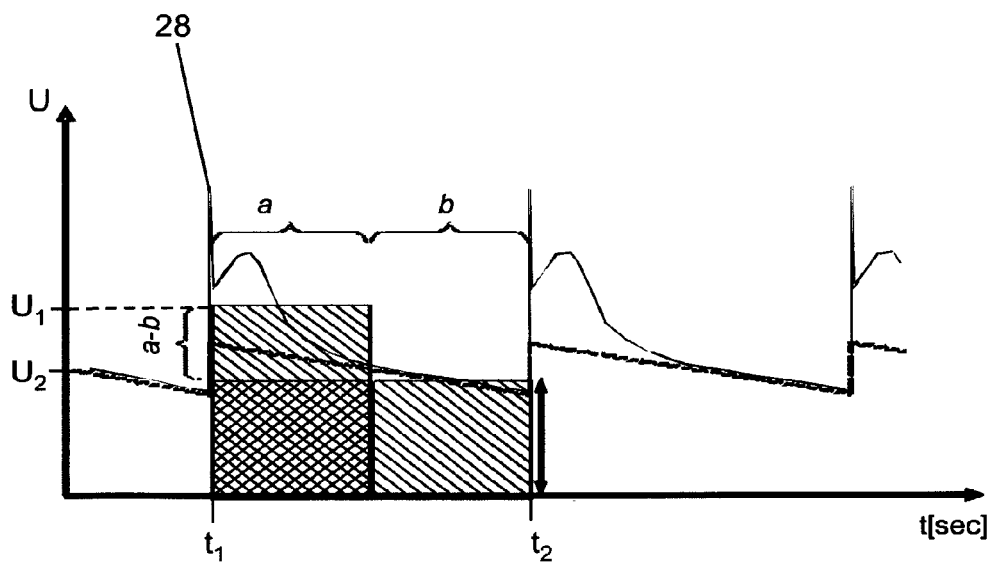

FIG. 2 shows the chronological sequence of the voltage U over the time period t. At the first time interval $t_1$, a radiation source, not depicted, emits a radiation impulse with, for example, a duration of 3 microseconds. Because of electromagnetic coupling into the dosimeter, the so-called EMV pulse, initially a voltage peak 28 results, which is filtered out, blanked or eliminated by the evaluation unit 20. The voltage U initially increases and then decreases quickly. At a second time interval $t_2=t_1+T$ a second pulse occurs, whereby T is the repetition time, i.e. the inverse repetition frequency. In general, the repetition frequency lies between 10 Hz and 400 Hz and depends on the radiation source in use.

Figure 4:
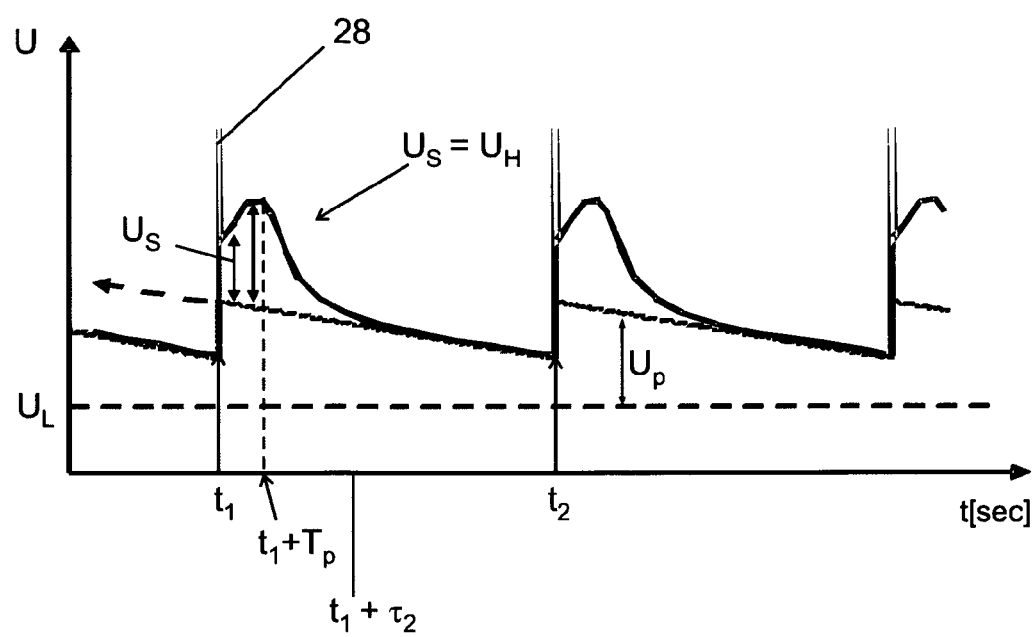

FIG. 4 shows that the voltage U does not decrease to zero, even when there is no radiation any more at the time interval $t_1+T_p$. $T_p$ is the pulse delay, which is determined by the RC element. The voltage U can be described as consisting of three component voltages. A first component voltage $U_L$ results from the conversion of a leakage current $I_L$ by the pre-amplifier 22, which converts the electrical current into an electrical voltage. The leakage current $I_L$ is constant in time. The leakage current originates mainly from an insufficient insulation or from a thermal current. Additionally, system humming or other interferences can be superimposed, which are not synchronous to the cycle of the accelerator.

A second constituent part of the voltage U is a voltage $U_P$, which originates from parasitic ionization. This ionization occurs, for example, in air cavities in plug connections and has a saw tooth or exponential shape. The remaining difference is the signal voltage $U_S=U-U_2-U_P$ which corresponds to a signal current and represents the actual signal to be evaluated.

It can thus be extracted from FIG. 2 how the absorbed dose D can be calculated from the method shown in the figure. In this way, the first measured values, which form the voltage peak 28, are a measure of the electromagnetic pulse interference by the radiation source. The height of the voltage peak 28 serves to detect a defect in the shielding of dosimeter probe 12 and the cable 18 (cf. FIG. 1).

For a better separation from the subsequent pulse, which represents the wanted signal, the maximum of the wanted signal is moved backwards in time. This results in, for example, the fixation of an RC-element 23 (cf. FIG. 1) before the input of the entrance to the computing device 24.

A data range from a time interval $t_1+n*\tau_2$ is used for the determination of the background radiation, whereby n represents a very small number, for example 1, 2, 3, 4, . . . 10, and $\tau_2$ is the time constant of the evaluation unit 20. For the evaluation of the background radiation, the curve between $t_1+n*\tau_2$ and $t_2$ is fitted with a model function. The model function can be to a constant function, a first or higher order polynomial, an exponential function or a compound of these functions.

The background radiation obtained in this way is subtracted from the signal and from the result the signal voltage is calculated, which has a maximum signal peak of $U_H$. Alternatively, the integral of the signal is regarded as the signal peak. It is possible to curve fit the difference between signal voltage $U_S$ and the background radiation, for example with a parabolic section of a third or higher degree, in order to determine the maximum or of the integral. Alternatively a complete model for the signal of the whole interval cycle can be curve fit. In this case, the model curve parameters are, amongst others, the signal peak from the useable volume, the signal peak from a parasitic volume and its time constants, as well as the background radiation signal. The sum of three exponential functions and one constant is a preferred model curve.

FIG. 2 shows in a schematic diagram how a method according to the invention is carried out, after the dosimeter 10 (cf. FIG. 1) has been located in the radiation field 26. First of all, at the time interval t1, the beginning of an interval cycle is determined. This can occur, for example, by the transmission of the peak voltage 28 by an edge detection process. Alternatively, a carrier signal is captured from the radiation source.

FIG. 2 shows the case in which two measurements are measured in the form of the average of the voltages $U_1$ and $U_2$, during the interval cycle from the beginning of an initial impulse to the time $t_2$, at which a subsequent pulse is detected. The voltages $U_1$ and $U_2$ represent the relevant value corresponding to the electrical charge. The first voltage $U_1$ is the first raw measured value $U_1$, the second voltage $U_2$ is the second raw measured value $U_2$. From these two raw measured values $U_1$ and $U_2$, the absorbed dose is defined by multiplication of the difference $U_1-U_2$ with a correction factor.

Figure 3:
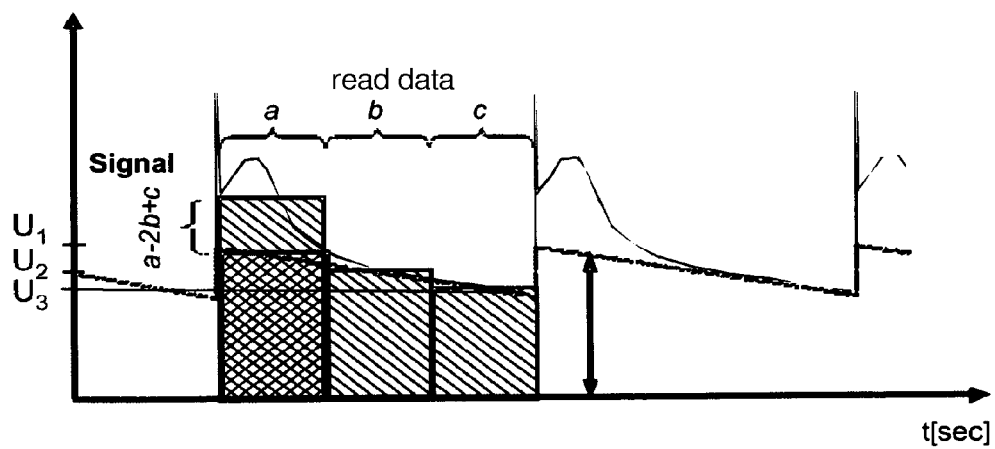

FIG. 3 shows the case that the measurement number is 3, which means that three voltages $U_1$, $U_2$, and $U_3$ are recorded. The radiation, i.e. the sum of the leakage voltage $U_L$ and the voltage $U_P$ of parasitic ionization, is calculated by extrapolation of the two most recently measured voltages. The electrical charge Q and also the absorbed dose D is thus proportional to $U_1-(2*U_2-U_3)$.

Figure 5:
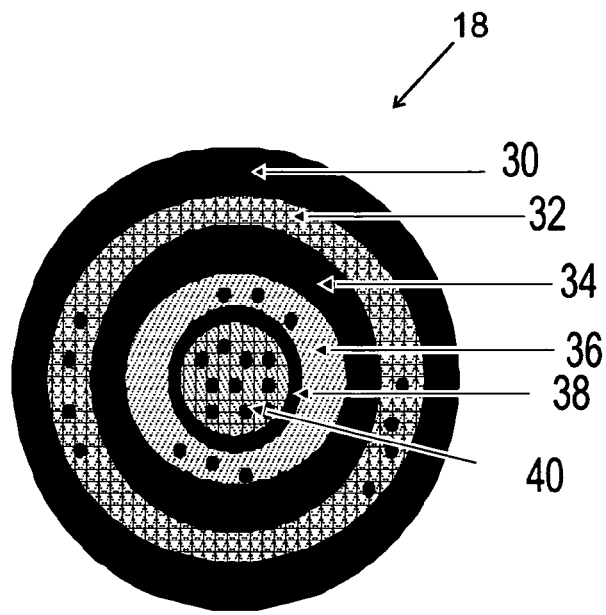

FIG. 5 shows a cross section through the cable 18 (cf. FIG. 1). This cable 18 is constructed in such a way that it resembles water in its interaction and thus can be identified as water equivalent. The cable 18 includes an outer insulation 30 made from a polyolefin tube with an inner diameter of 0.6 mm with a wall thickness of 0.4 mm. An outer shield 32 is located radially inside, which is made from 300 carbon fibers, each with a diameter of 5 µm. The outer shield 32 surrounds a shield insulation 34 made from a polytetrafluoroethylene tube, which has an inner diameter of 0.4 mm and a wall thickness of 0.05 mm.

The shield insulation 34 surrounds an inner shield 36, which, like the outer shield, is made from 300 carbon fibers each with a diameter of 5 µm, which are woven around it. The inner shield 36 surrounds an inner insulation 38 in the form of a polytetrafluoroethylene tube with an inner diameter of 0.2 mm with a wall thickness of 0.05 mm. Finally, the inner insulation 38 surrounds a core 40 in the form of 600 carbon fibers with a diameter of 5 µm.

FIG. 1 shows that the core 40 is in contact with the central electrode 15. The inner shield 36 is connected with a shield electrode 42 of the dosimeter probe 12 and the outer shield 32 is in contact with the outer electrode 16.

The central electrode 15 is connected with the core 40 and the inner shield 36 lies on amplifier earthing, whereas the outer shield 32 is held on an electric potential against amplifier earthing by a power supply.

Figure 6:
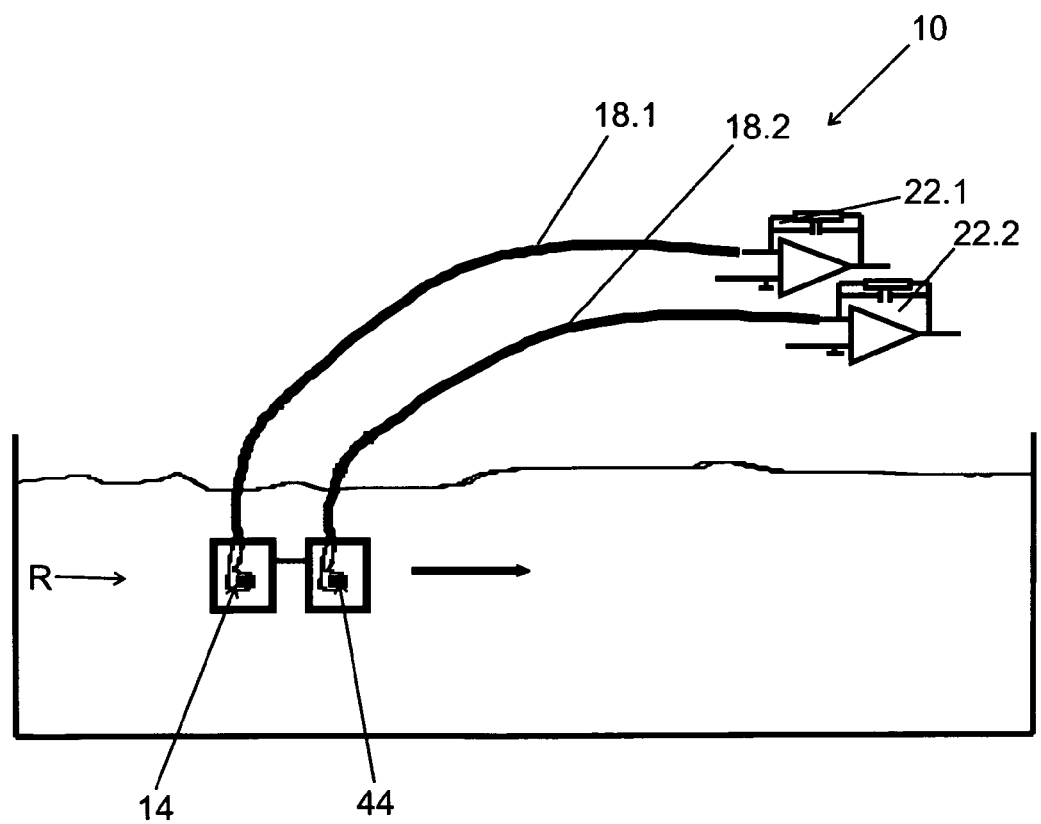
Figure 7:
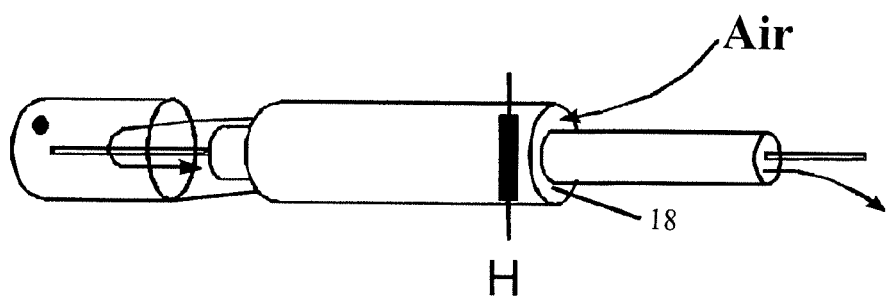

FIG. 6 shows a schematic diagram of a dosimeter 10 according to the invention which, along with the first sensor 14 made from silicon, includes a second sensor 44 that is made from another material, in this case gallium nitrate. The second sensor 44 is closely connected with the first sensor 14. Both sensors 14, 44 are connected respectively by cable 18.1, 18.2 with the respective pre-amplifiers 22.1, 22.2, which in turn are connected with the computing device, not depicted. The computing unit calculates, for example, the dose fraction of low energy scattered photons, by means of the above described differences in sensitivity, with regards to the different radiation proportions. It is favorable to move the connected sensors along the direction of their connection axis SR in such a way that measurements are taken at the same position with each sensor.

The carbon fibers, from which the core 40 of the cable 18 is made, with a diameter of 5 µm and a length of 1.50 m, have a resistance of approx. 100 kΩ. A cable of around 100 individual fibers thus has a resistance of 1 kΩ, which can be neglected for the currents in the aforementioned circumstance lying in the region of nanoamperes. As carbon only has a small atomic number of 6 in contrast to metals and since the fiber bundle is very thin, the cable 18 barely disturbs a radiation field 26. For the improvement of the water equivalence through an increase of the electron density, polyethylene fibers can be added.

It is possible to treat the outer shield 32 and/or the inner shield 36 with acrylic resin-graphite spray so that the shielding is improved. The cable 18 is designed in such a way that it resembles the behavior of water towards photon radiation as closely as possible. For this purpose, polymers made from partially fluorinated carbon materials can be added to the cable 18. The cables 18 are especially designed in such a way that they can be moved in a water bath by another detector with causing a change in the measurement result of the second detector.

Sensor 14 can concern a micro ionization sensor filled with air. In this case, the cable 18 preferably includes an air canal to balance the pressure, whereby this canal is in contact with the micro ionization chamber.

The invention claimed is:

1. A dosimeter for measuring an absorbed dose of a radiation field, with a dosimeter probe comprising:
   a first sensor, which has a sensor volume that emits electrical charges dependent on the exposure to ionizing radiation,
   a cable for transmission of the electrical charges, and
   an evaluation unit for capturing a physical quantity, which corresponds to the emitted electrical charges, the evaluation unit operable to
      detect an interval cycle of the radiation field,
      collect at least two raw measured values including a first and at least a second raw measured value of a physical quantity corresponding to the electrical charge, wherein the first and at least a second raw measured value are always read at the same time relative to the interval cycle, so that each of the at least two raw measured values are obtained once per interval cycle, calculate a measured value from the at-least two raw measured values, the measured value being related to the absorbed dose deposited in the sensor volume.

2. The dosimeter according to claim 1, wherein the at least two raw measured values includes at least three raw measured values.

3. The dosimeter according to claim 2, wherein the evaluation unit is operable to detect a radiation signal, within the interval cycle of the radiation field, from the at-least three raw measured values.

4. The dosimeter according to claim 1, wherein the sensor volume is configured such that a radiation field with an absorbed dose rate of 1 gray per minute causes an emitted current of less than 10 nanoamperes.

5. The dosimeter according to claim 1, wherein the sensor volume is configured such that a radiation pulse with a pulse duration of 3 microseconds, which originates from a medical radiation therapy accelerator with a pulse rate of 300 pulses per second and an average absorbed dose rate of 2 grays per minute, causes an emitted charge of less than 100 picocoulombs.

6. The dosimeter according to claim 1, further comprising a charge pre-amplifier or a current preamplifier for the conversion of the charge or electrical current into a voltage signal for the evaluation unit.

7. The dosimeter according to claim 1, wherein the evaluation unit is operable to capture a trigger signal from a radiation source, wherein said radiation source is a medical radiation therapy accelerator.

8. The dosimeter according to claim 1, wherein the evaluation unit has an input upon which individual or clocked charge pulses can be applied in order to calibrate the evaluation unit.

9. A dosimeter probe for a dosimeter according to claim 1, wherein the cable is made from a material which is water equivalent for radiation.

10. The dosimeter probe according to claim 9, wherein the cable has at least one carbon fiber for the conduction of the electrical charge.

11. The dosimeter probe according to claim 10, wherein the carbon fiber has a diameter of less than 1 mm.

12. The dosimeter probe according to claim 9 wherein the cable includes synthetic fibers.

13. The dosimeter probe according to claim 9, wherein the cable is a coaxial cable.

14. The dosimeter probe according to claim 9 wherein the cable is a triaxial cable.

15. The dosimeter probe according to claim 9, wherein the cable includes a ventilation duct, which is connected with the first sensor for aeration.

16. The dosimeter probe according to claim 9, wherein the cable includes separate air channels for aeration and ventilation.

17. The dosimeter probe according to claim 16, further comprising a device for increasing a temperature difference at the openings of the separate air channels, the openings facing away from the first sensor, so that the air exchange in the first sensor can be increased for aeration and ventilation.

18. The dosimeter probe according to claim 9, wherein the first sensor is surrounded by a water equivalent synthetic housing.

19. A dosimeter, according to claim 9, further comprising at least a second sensor with a sensor material which is different to that of the first sensor, the second sensor having a second sensor response for the various radiation proportions, according to particle type, particle energy and direction of incidence, the second sensor response of the second sensor being different to a sensor response of the first sensor.

20. The dosimeter probe according to claim 19, wherein the first sensor is located in close proximity to the at-least a second sensor.

21. The dosimeter probe according to claim 19, wherein a sensor material of the first sensor and the sensor material of the at-least a second sensor are each selected in such a way that a dosage of a proportion of the radiation field, according to particle type and particle energy, can be determined.

22. The dosimeter probe according to claim 19, wherein each of the first and at least a second sensors are connected by the cable, and wherein the cable has a carbon fiber for conduction of the electrical charges.

23. A method for measuring an absorbed dose of a pulsed radiation field comprising:
（a) arranging a dosimeter in the radiation field, the dosimeter including a first sensor with an active sensor volume that emits electrical charges dependent on the exposure to ionizing radiation,
(b) determining an interval cycle of the field of radiation,
(c) collecting at least two raw measured values including a first and at least a second raw measured value of a physical quantity corresponding to the electrical charge, wherein the first and at least a second raw measured value are always read at the same time relative to the interval cycle, so that each of the at least two raw measured values are obtained once per interval, and
(d) determining an absorbed dose from the at-least two raw measured values.

24. The method according to claim 23, wherein a beam of the pulsed radiation field has a cross section with a maximum of 40 millimeters.

25. The method according to claim 23, wherein the active sensor volume enables the dosimeter to emit an average electronic current of a maximum of 10 nanoamperes.

26. The method according to claim 23, wherein the step of determining an absorbed dose includes subtracting a background signal.

27. The method according to claim 26, wherein the background signal is detected from a number of measurements at the end of the interval cycle.

28. The method according to claim 27, wherein the background signal is calculated by means of a linear function which interpolates measurements at the end of the interval cycle.

29. The method according to claim 23, wherein the step of determining an absorbed dose includes measuring and subtracting a parasitic absorbed dose from a parasitic volume proportions of the sensor.

30. The method according to claim 29, wherein the step of measuring the parasitic absorbed dose from the parasitic volume proportions of the sensor includes a deduction of the absorbed dose.

31. The method according to claim 23, wherein the absorbed dose includes a parasitic absorbed dose from parasitic volume proportions of the sensor and a radiation signal, that are each obtained by curve fitting a model function to the measurements of the interval cycle.

32. The method according to claim 23, wherein the step of determining an interval cycle includes the capture of a trigger signal of an accelerator, wherein the gamma radiation field of the accelerator is measured.

33. The method according to claim 23, wherein the step of determining an interval cycle occurs by means of edge detection in sensor data.

34. The method according to claim 23, wherein the source of the pulsed radiation field is a radiation therapy device.

35. The method according to claim 23, further comprising the step of calculating a dose fraction of a proportion of the radiation field, the proportion being determined according to particle type and particle energy, from a first signal of the first sensor and a second signal of an at-least second sensor.

36. The method according to claim 23, further comprising the step of repeating steps (a) to (d), wherein the at least two raw measured values are obtained at different positions within the interval cycle, so that an absorbed dose or absorbed dose value which is dependent on the position within the interval cycle is gained.

* * * * *